US008041452B2

(12) United States Patent
Park et al.

(10) Patent No.: US 8,041,452 B2
(45) Date of Patent: Oct. 18, 2011

(54) LOGISTICAL SYSTEM AND METHOD FOR CONTROLLING FLOW OF POSTAL MAIL IN REAL-TIME

(75) Inventors: Moon Sung Park, Daejeon (KR); Wan Seok Kim, Daejeon (KR); Jong Heung Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1168 days.

(21) Appl. No.: 11/635,221

(22) Filed: Dec. 7, 2006

(65) Prior Publication Data

US 2008/0082205 A1 Apr. 3, 2008

(30) Foreign Application Priority Data

Sep. 29, 2006 (KR) .................. 10-2006-0095852

(51) Int. Cl.
 *G06F 7/00* (2006.01)
(52) U.S. Cl. ...................... 700/223; 209/584
(58) Field of Classification Search .................. 700/224, 700/223; 209/583, 584; 705/28
See application file for complete search history.

(56) References Cited

U.S. PATENT DOCUMENTS

| | | | |
|---|---|---|---|
| 4,051,969 A * | 10/1977 | Homanick | 414/679 |
| 6,101,487 A | 8/2000 | Yeung | |
| 6,674,038 B1 * | 1/2004 | Latta | 209/584 |
| 6,894,243 B1 | 5/2005 | Avant et al. | |
| 7,663,072 B2 * | 2/2010 | Conard et al. | 209/584 |
| 2004/0207867 A1 * | 10/2004 | Stringham | 358/1.15 |

OTHER PUBLICATIONS

Bando, H., "Processing of Undeliverable Mail as Addressed in Japan." 13th Conference on Postal Automation, entire document.*

* cited by examiner

*Primary Examiner* — Ramya Prakasam
(74) *Attorney, Agent, or Firm* — Ladas & Parry LLP

(57) ABSTRACT

A method and system for controlling the flow of postal mail in real-time are provided. The logistical system includes a pre-application processing system, a real-time mail planning and adjusting system, and a real-time working planning and performing system. The pre-application processing system registers bulk mail inputted in a generating system, and generates sending data and quantity data of the registered bulk mail. The real-time mail planning and adjusting system collects predetermined working plan quantities to process the quantity data for respective distribution centers, and allocates temporary vehicles when a quantity for delivery between the distribution centers exceeds processing capacities of the distribution centers. The real-time working planning and performing system uses the quantity data to transfer a quantity of mail for processing to postal distribution centers, and collects and compares working plans from each of the postal distribution centers.

12 Claims, 8 Drawing Sheets

LOGISTICAL SYSTEM AND METHOD FOR CONTROLLING FLOW OF POSTAL MAIL IN REAL-TIME

BACKGROUND OF THE INVENTION

1. Field of the Invention

The present invention relates to a method and system for controlling the flow of postal mail in real-time, and more particularly, to a logistical system and method capable of devising a plan for handling postal mail from receipt to completion of delivery, based on a method for collecting data on the quantity of mail to be delivered; effectively controlling the loads placed on postal agencies, postal centers (mail sorting centers; outward and inward sorting centers), and collection and delivery centers (hereinafter collectively called distribution centers), based on the amount of mail collected; and efficiently performing the delivery of collected mail; thereby improving postal service quality transparency and reliability.

2. Description of the Related Art

Generally, individuals' mail sent by post includes correspondence for relaying good wishes, greetings, information, etc. Commercial mail includes bills to be paid, which are sent through the mail by credit card and communication service providers, public institutions, etc., and bulk mail sent by companies and institutions for advertising and public notification. Publications include magazines, newsletters, and the like in the form of newspapers and booklets. The postal market is divided according to types of mail.

The above types of mail, which are individuals' mail, bills, advertisements, and publications, account for 95% or more of all postal mail. Senders of mail can largely be divided into individuals and companies, and mail sent by companies includes bills, advertisements, and publications. Currently, the amount of corporate mail accounts for 80-90% of all mail. The reason for an increase in the total amount of mail sent is attributable to an increase in mail sent by companies. This corporate mail (that is, bulk mail) has increased, offsetting a decline in the amount of mail sent by individuals. This trend is projected to continue.

A method of using barcodes to automatically sort addresses or postal codes on mail that cannot be read in an automatic processing system is disclosed in U.S. Pat. No. 6,894,243, which is hereby incorporated by reference. Also, U.S. Pat. No. 6,101,487, which is hereby incorporated by reference, discloses a method of more effectively processing bulk mail and preparing for collection, so that postage fees can be calculated based on the results of automatic separation of collected mail. Additionally, the "Processing of Undeliverable Mail as Addressed in Japan" in the 13th International Conference on Postal Automation (Vol. 1, May 23, 1999) discloses a method of using barcode labels to perform automated distribution, in order to simplify automated sending of mail and resending of mail due to declarations of address changes.

However, because in the above methods, companies normally use the common method of sending bulk mail through the nearest distribution center (from postal agencies, mail collection centers, and mail sending centers (outward sorting centers)), the mail cannot be collected by more than one collecting center. Accordingly, a large quantity of bulk mail is collected by and must be processed through one of a network of distribution centers. A processing method must be adopted based on whether the mail collected by the one distribution center must be delivered within the same region or to another region. Using this processing method, mail is transferred to other mail collection centers or distribution centers in other regions, where the destinations are categorized according to a delivery standard (such as a postal code).

This type of delivery processing involves delivering the mail within a predetermined timeframe to mail collecting centers and postal centers, and completing the processing of sent and arriving mail at the postal collecting centers within the allotted delivery time; and obtaining the results of the preceding operation to use in analyzing the operational results, and devising and using a plan for maintaining high quality mail delivery conditions under normal circumstances from collection to delivery. However, during the processing and transferring of mail from collecting offices and relaying offices, collecting offices and postal centers (including transit centers), and postal centers and collection and delivery centers, an increase in load at the postal centers leads to delays in a first sorting process and a second process at the postal centers, so that quality in delivery service drastically declines and further mail that arrives for processing and delivery at the postal centers is also delayed.

Such methods are only effective when loads that postal centers are capable of handling within a predetermined delivery time frame are handled by the postal centers. When a load that exceeds the capacity of a postal center is imposed, a decline in the delivery quality is inevitable. Also, when examining the capacities of postal centers for processing delays on the bases of a point of completing, the collection of a quantity of mail, and the processing capacities of the postal centers to devise a working plan, when the quantity of incoming mail suddenly increases, the delivery speed inevitably suffers. Furthermore, when the above methods for processing mail are used, and the postal vehicles for delivering mail are delayed, delivery quality is reduced.

Also, because postal centers are located mostly in densely populated urban areas, where large quantities of mail are collected and sent, the quantity of mail sent to rural areas is large, while the quantity of mail collected from rural areas to be sent to urban areas is small. More effectively controlling this type of mail flow by creating an improved delivery system and detecting and overcoming bottlenecks in the flow of mail is a difficult task.

Although the automated sorting function includes postal codes in barcodes to maximize its effectiveness, there are cases where the automated sorting barcode is not printed by a customer or during the collecting process.

In the above method, mail with postal codes is automatically sorted, and mail without postal codes is sorted by employing the method disclosed in the above-mentioned U.S. Pat. No. 6,894,243. The method of the former patent is for automatically processing normal mail.

When quick delivery service for normal mail is not required, there is ample time allotted for delivery, so that the mail is processed in a normal manner through delivery centers (post offices that collect/receive, sort and allot, and deliver mail, postal centers, and collection and delivery centers, that are collectively called distribution centers). However, during the processing and transferring of mail from collecting offices and relaying offices, collecting offices and postal centers (including transit centers), and postal centers and collection and delivery centers, an increase in load at the postal centers leads to delays in a first sorting process and a second process at the postal centers, so that quality in delivery service drastically declines and further mail that arrives for processing and delivery at the postal centers is also delayed. Therefore, a method for minimizing the causes of the mail delivery delays by controlling the flow of mail in real-time is needed.

SUMMARY OF THE INVENTION

Accordingly, the present invention is directed to a logistical system and method for controlling the flow of postal mail in real-time, which substantially obviates one or more problems due to limitations and disadvantages of the related art.

It is an object of the present invention to provide a method for controlling the flow of mail in real-time and a system thereof that devise a plan for handling postal mail from receipt to completion of delivery, based on a method for collecting data on the quantity of mail to be delivered, effectively controlling the loads placed on mail processing centers based on the amount of mail collected, and efficiently performing the delivery of collected mail, thereby improving postal service quality transparency and reliability.

It is another object of the present invention to provide a method for controlling the flow of mail in real-time and a system thereof that perform delivery processing by obtaining delivery routes and delivery data derived through a processing system in real-time when collecting bulk mail from clients, that reflect actual delivery data upon receipt of mail to optimize the working plans of postal centers and collection and delivery centers and the delivery routes of the mail, analyze the levels of uniformity in distribution of work load among postal centers and collection and delivery centers to devise a plan in real-time, and allow for the controlling of the flow of mail in real-time according to the analysis results, in order to manage the quality of mail delivery.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a pre-application processing system including: an application data registration manager for providing sorting and required planning data of postal centers and postal codes by collection and distribution centers, in a process of preparing a sorting of mail to be sorted by type and a transferring of the sorted mail to distribution centers, and generating a pre-application quantity data of a pre-applied quantity of mail, a bulk mail pick-up collector for performing a sorting process of postal address files with postal centers, collection and distribution centers, postal codes, and a sorter and a sorting plan, when an address file for generating bulk mail is obtained through the sorting reference data, and for generating a bulk mail generating quantity data and pre-applying the bulk mail; a calculator for a transfer plan by sending/receiving (outward/inward)/delivering centers for comparing reference data and arrival postal centers by same regions as pre-application quantity data registered through the application data registration manager, and transfer quantities for collection and distribution centers, and determining a collection of bulk mail generated results.

When the mail is not for pick-up collection, there is provided: a pre-application processing system for registering bulk mail inputted in a generating system for generating bulk mail, and comprising sending data and quantity data of the registered bulk mail; a real-time mail planning and adjusting system for collecting predetermined working plan quantities to process the pre-application that processes the quantity data for respective distribution centers, comparing operating reference data of transport vehicles between the distribution centers for setting transport vehicle dates, and allocating temporary vehicles when a quantity for delivery between the distribution centers exceeds processing capacities of the distribution centers; and a real-time working planning and performing system for using the quantity data to transfer a quantity for processing by distribution center and by work processes to postal distribution centers, and collecting and comparing working plans from each of the postal distribution centers and processing the working plans.

The real-time working planning and performing system may include: an operation result manager using the pre-application quantity data to relay a work load by center and by work process to mail distribution centers, and providing a quantity data for devising a working plan for the distribution centers; and a manager for generating/adjusting/performing a working plan, comparing work load data and a reference work processing quantity for each distribution center by type of mail and work process, and designating the workload data as a working plan if the workload data is less than the reference work processing quantity.

In a further aspect of the present invention, there is provided a method for real-time controlling of postal mail flow, including the steps of: pre-application registering for registering a quantity of mail data and projected sending date data by mail type and presorted condition, for pre-application quantity data registered prior to bulk mail generation; performing a first calculating step for calculating a workload of the quantity of mail data registered in the step of pre-application registering by post office, postal center, and collection and delivery center that perform mail processing, and calculating a transferable quantity after the transferable quantity is received from postal centers that perform sending/receiving/delivering sorting processes; performing a first determining step for examining and determining a working plan through relaying a mail quantity to postal centers and collection and delivery centers, reflecting the quantity data transferred to relevant distribution centers and generating working plan data, and analyzing workloads of distribution centers; adjusting a working plan devised by the distribution centers in the step of first determining through receiving quantity data by mail type for which application has been completed and data that has been completely processed at the distribution centers and is delivered; performing a first comparing step for generating quantity data comparing mail processing work capacities of neighboring post offices, postal centers, collection and delivery centers for the adjusted working plan in the step of adjusting the working plan; performing a second determining step for determining a postal working plan for minimizing unnecessary mail processing through considering a pre-applied quantity from the pre-application quantity data in the step of pre-application registration, the mail processing work capacity of the relevant distribution centers, and quantity data compared in step of the comparing, and through setting a maximum number of routes with shortest distances between the distribution centers and nearest post offices, postal centers, collection and delivery centers, and delivery centers; performing a first notifying step for notifying a decision maker of a mail processing result through examining hindering reasons of postal processing quality, using a bulk mail generating schedule and forecasted generating completion data, and working plan data of postal centers, considering delivery quality, working costs, and delivery costs up to a delivery completion point, and generating mail processing result data for adjusting a flow of postal mail in real-time; revising a working plan including sorting plan data of a sorter, and generating revised data, through receiving the pre-application data generated in the first notifying step and mail processing result data as a basis for determining a plan according to an approval of the decision maker, and relaying a determined data for operation to each distribution center;

and performing a third determining step for determining the working plan through revising a workload data included in the distribution centers receiving the revised workload data.

The system may include an application data registration manager for providing sorting and required planning data of postal centers and postal codes by collection and distribution centers, in a process of preparing a sorting of mail to be sorted by type and a transferring of the sorted mail to distribution centers, and generating a pre-application quantity data of a pre-applied quantity of mail.

The system may also include a bulk mail pick-up collector for performing a sorting process of postal address files with postal centers, collection and distribution centers, postal codes, and a sorter and a sorting plan, when an address file for generating bulk mail is obtained through the sorting reference data, and for generating a bulk mail generating quantity data and pre-applying the bulk mail.

The system may further include a calculator for a transfer plan by sending/receiving/delivering centers for comparing reference data and arrival postal centers by same regions as pre-application quantity data registered through the application data registration manager, and transfer quantities for collection and distribution centers, and determining a collection of bulk mail generated results.

The system may still further include mail collection and transfer plan generator and manager for inquiring whether excesses or deficiencies of work loads arise at distribution centers, and whether a bulk mail generation completion forecast exists.

In the method of controlling the flow of postal mail in real-time according to the present invention, there is provided a pre-application registration operation for registering data on the pre-application quantity data registration by mail type and presorted state and quantity and projected generating date, prior to the generating of bulk mail.

The system may include an operation result manager using the pre-application quantity data to relay a work load by center and by work process to mail distribution centers, and providing a quantity data for devising a working plan for the distribution centers.

The system may also include a manager for generating/adjusting/performing a working plan, comparing work load data and a reference work processing quantity for each distribution center by type of mail and work process, and designating the workload data as a working plan if the workload data is less than the reference work processing quantity.

Each work plan quantity designated for the respective distribution centers' work plans are collected to compare the operating data of transport vehicles between the distribution centers and make a schedule for the transport vehicles. When a quantity exceeds a standard quantity, temporary vehicles are dispatched.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Below, a method of controlling the flow of mail and a system thereof according to the present invention will be described with reference to FIGS. 1 through 8.

Figure 1:
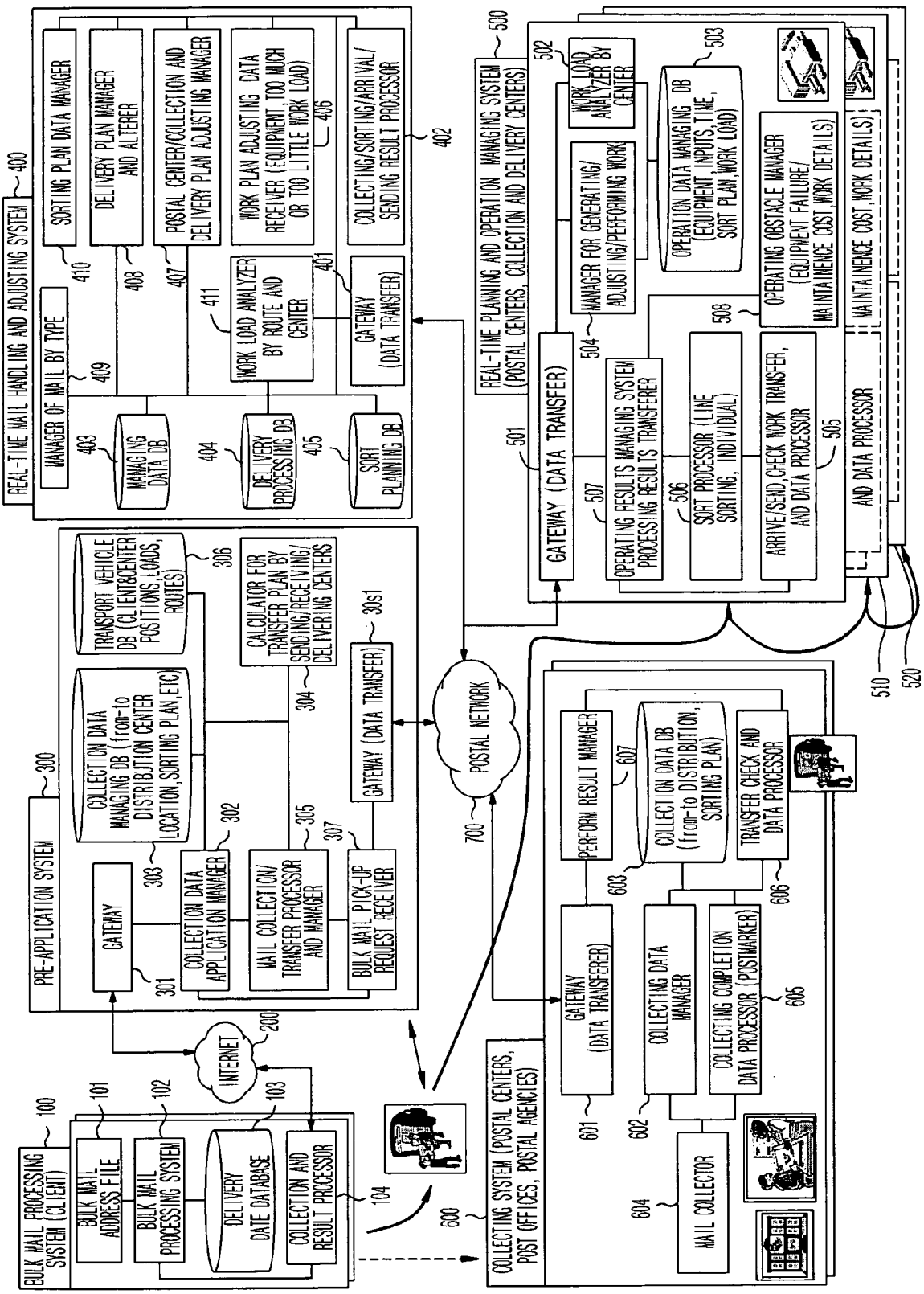
FIG. 1 illustrates a block diagram of a system for controlling the flow of mail in real-time according to an embodiment of the present invention.

FIG. 1 illustrates a block diagram of a system for controlling the flow of mail in real-time according to an embodiment of the present invention.

A real-time method of controlling the flow of mail according to the present invention will now be described with reference to FIG. 1.

The structure of the system according to the present invention can largely be divided into a bulk mail processing system 100, a pre-application system 300, a mail planning and adjusting system 400, a real-time planning and operation managing system 500, and a collecting system. The bulk mail processing system 100 and the pre-application system 300 are connected through the internet 200, and the pre-application system 300, the mail planning and adjusting system 400, the real-time planning and operation managing system 500, and the collecting system 600 are connected through a postal network 700.

Entities that send bulk mail, that is, companies and other institutions that produce bulk mail, send a delivery request to a distribution center, upon which they are sent a bulk mail address file 101. They then enter data into a bulk mail processing system 102 that manages mail processing. The application delivery data is stored in a delivery date database 103 that manages delivery dates by the companies that produce bulk mail and the delivery data is used to begin processing and delivering the mail. The delivery data stored in the delivery data database 103 is data inputted according to the production schedules of the bulk mail producing companies, including mail production plans for managing operating plans and processing methods. Generally, clients that generate mail, come to a post office or a distribution center in person to apply for delivery of mail, where they can enter the data in a file form.

Pick-up service is also available. Thus, after making an appointment, they may come in person or request pick-up service.

In the case of an appointment, when the processing plan is completed according to the delivery data, a bulk mail sender connects to a collection data application manager 302 through a gateway 301 within the pre-application system 300 using the internet 200 and delivery system 202, in order to input application data for determining a postage fee through a collection and result processor 104 of the bulk mail processing system 100 or register data in the bulk mail delivery date database 103. In the case of an initial request for delivery, a bulk mail sender enters a company address, postal code, e-mail, identity, and password as client data, and other data such as an average amount of mail produced per month. When the client data is inputted, the client receives a client number. When the initial data for inputting has been inputted, it is determined whether the application process has been completed. When data including quantity by type of mail, a pre-classified unit quantity, a day and time for collection, etc. is entered, the pre-applied quantity data that includes bulk mail workload data corresponding to clients' data is registered in a collection data managing 303.

The bulk mail workload data includes pre-application data that is generated twice or more and relayed to the pre-application system 300 from the bulk mail processing system 100, workload data after the completion of registration, and workload data that can be used for setting and adjusting a working plan for transferring workload data, etc. in sequence after sorting and delivery processes are performed at postal centers. For this, the distribution center IDs for sorting the distribution centers by region, postal codes, and sorting plan data of postal center sorting equipment are provided through the collection and result processor 104 and pre-application system 300 to a sorting plan data manager 410 and the collection data managing database 303; and even when a change occurs, the data is sent through the collection and result processor 104 to the calculator for transfer plan by sending/receiving/delivering centers 304.

The calculator for transfer plan by sending/receiving/delivering centers 304 may receive the data through the internet in file form as in the above process and through a direct input in the delivery system 202, and calculates the quantities to transfer to the distribution centers using a quantity of mail by pre-categorized unit (by whether or not barcodes are used) from the pre-applied quantity data registered in the collection data managing database 303, postal codes, distribution center IDs, and a mapping table.

The calculator for transfer plan by sending/receiving/delivering centers 304 uses the calculated quantities to recalculate quantities by regional postal center (for example, in the case of bulk mail sending companies registered in urban areas, quantities of mail are calculated by postal centers located in urban districts), and compares quantities of mail from the bulk mail sending companies to the quantity of mail that to be sorted on arrival from the mail transferred to the same districts.

When the generated amount of mail to be sorted upon arrival from the mail to be presorted at the postal centers is forecasted to exceed a predetermined volume of pallets and loads, for example, one pallet or approx. 300 million tons, then the mail is designated as mail to be collected by type of mail. The predetermined volume may be adjusted according to the total volume of mail collected per year or logistics factors.

Also, the calculator for transfer plan by sending/receiving/delivering centers 304 calculates a delivery quantity for each sorter when mail to be sorted exits for each sorting plan of sorters (sorting equipment), and does not calculate the quantity when mail must be transferred to the collection and delivery centers in a presorted condition, but calculates only the workload to be transferred. The monthly quantity for collection and delivery is also calculated. The mail collection/transfer processor and manager 305 searches the transport vehicle DB that manages data on the locations, transport vehicles, carrying loads, routes, delivery time, etc. based on the client location, distribution centers (post offices, postal centers, collections and delivery centers) by managed districts (metropolitan areas and provinces), based on this calculated pre-applied quantity data, and allocates transport vehicles and delivery loads, sending centers, and forecasted collection time, based on the presorted data.

The present invention manages the above in the cases of pick-up request applications as well. The bulk mail pick-up request receiver 307 searches the pre-application registration data of a quantity of mail to be generated from the pick-up request application of a bulk mail generating company, and determines whether the quantity is small and if it can be sorted and collected, and generates pick-up result data including delivery information such as the carrying load of transport vehicles, routes, and time taken.

The bulk mail pick-up request receiver 307 notifies the collection and result processor 104 of the bulk mail processing system 100 about the pick-up result data through the gateway 301 within the pre-application system 300 and the internet 200.

When the collection and result processor 104 receives the pick-up request application result data, when an approval result of the notification results is sent to the collection data application manager 302 through the internet 200 and the gateway 301 in the pre-application system 300, the collection data application manager 302 checks the pick-up application result data and uses the pick-up application result data to generate delivery plan data and store it in the collection data managing DB 303.

Additionally, the mail collection/transfer processor and manager 305 of the pre-application system 300 uses the stored delivery plan data to generate delivery data for transferring pre-applied quantities of mail to be sent to other districts to the nearest postal centers according to the location data of the bulk mail generating clients, and stores this data in the collection data managing DB 303.

The collection data application manager 302 provides selection data in order for an in-person application method to be selected when the bulk mail generating client chooses to apply in person at an appropriate postal center.

In order to use data for devising a working plan for the postal centers and collection and delivery centers, the pre-application quantity data registered in the collection data application manager 302 is transferred to a collection/sorting/arrival/sending result processor 402 through a postal network 700 and a gateway 401 of a real-time mail handling and adjusting system 400. The collecting/sorting/arrival/sending result processor 402 sorts the quantity data by postal center, collection and delivery center, type of mail, and processing method, when the receipt of the pre-application quantity data is completed, registers the transfer quantity data that is the quantity data from the pre-application that is sorted by the managing data DB 403 and the delivery processing DB 404, and transfers the quantity data for transferal by relevant postal centers and collection and delivery centers to the work load analyzer by center 502 through the gateway 401 and the gateway 501 of the real-time planning and operation managing system 500.

The work load analyzer by center 502 receives and uses the transfer quantity data to calculate whether mail for each distribution center is excessive or insufficient during the operation of the manager for generating/adjusting/performing working plan 504, through the workload received results of the projected receiving dates and sorting plans, work processes, equipment, inputting, processing capacity, and basic working format, which are data in the operation data managing DB 503.

The working plan data, in which the data on whether the mail quantity is excessive or insufficient for each distribution center calculated through the manager for generating/adjusting/performing working plan 504 is reflected, is relayed through the gateway 501 and the gateway 401 of the real-time mail handling and adjusting system 400 to the work load analyzer by route and center 411. The work load analyzer by route and center 411 receives processing results data according to working plan data for each day that has been revised by the each postal center and collection and delivery center, and performs a checking process of whether the data on whether the revised results data and the delivery routes inside the delivery processing DB 404 exceed the basic plan, and whether the basic mail processing loads of the postal centers and collection and delivery centers in the sort planning DB are exceeded.

In the case of collecting files and picking up files, when the above-described process is repeated for each registration of pre-application data from bulk mail generating companies, the workload may be calculated on a daily and hourly basis. Also, when a working plan of the pre-application quantity from another bulk mail generating company altered by the work load analyzer by center 502 and the operation data managing DB 503 exceeds a quantity that can be processed, the bulk mail is sorted by mail type, and the amount of processing mail to be sent, received, and delivered, and a resultant working plan adjustment request data of the excessive work load is relayed in real-time to the working plan adjusting data receiver 406 of the real-time mail handling and adjusting system 400.

When a long-term repair is required due to a breakdown of sorting equipment, and a long-term repair request data is registered in an operating obstacle manager 508, upon registration, a working plan adjustment data is transferred in real-time through respective gateways 501 and 401 and the postal network 700 to the working plan adjusting data receiver 406 of the real-time mail handling and adjusting system 400.

The working plan adjusting data receiver 406 compares the postal centers corresponding to the received results to the working plan data by collection and delivery center and relevant dates, and determines whether the work is a processing of the mail by type. The method of comparison compares whether a delivery quality is maintained when an excessive quantity of mail that has bee sorted in sending sorting and receiving sorting is relayed to corresponding postal centers, and checks whether transport vehicles can be allocated and allocates vehicles that have not been allocated, and checks whether temporary vehicles may be allocated if there are no existing transport vehicles allocated. The thus compared working plan data is sent from the working plan adjusting data receiver 406 through the controlling of the postal center/collection and delivery plan adjusting manager 407 to the work load analyzer by route and center 411, and the work load analyzer by route and center 411 generates a working plan by route and by center. The work load analyzer by route and center 411 relays the working plan data by route and center to a delivery plan manager and alterer 408, in order alter the allocation of results of the delivery vehicles for mail that is collected or relayed to postal centers according to the controlling of the postal center/collection and delivery plan adjusting manager 407. The delivery plan manager and alterer 408 registers the altered delivery plan data in the delivery processing DB 404 according to the controlling of the postal center/collection and delivery plan adjusting manager 407, and transfers searched data to the manager for generating/adjusting/performing working plan 504 though the gateway 401, the postal network 700, and the gateway 501 of the real-time planning an operation managing system 500.

When the manager for generating/adjusting/performing a work plan 504 receives the altered delivery plan data, results set as work plans at relevant distribution centers are registered in the operation data managing DB 503, and work transfer plans and sorting plans are altered and decided.

The above changing of the work plans may similarly be implemented to effectively change delivery plans for postal centers and collection and delivery centers, in the event that the postal center/collection and delivery manager 407 and the delivery plan manager alterer 408 should receive operation stopping data on account of a registration of data on a long-term repair schedule of sorting equipment of postal centers, vehicle breakdown, vehicles involved in accidents causing immobility, etc.

Thus, the postal operation is managed on a daily basis. One day before the completion of the drawing up of a general work plan, a process of comparing the work plan data by type of mail and time to processing capabilities, and generating additional data for processing mail is performed. In this process, bulk mail generating and managing schedule data is compared; and when a forecasted quantity that has been generated exists, a process of checking whether the workload can be added to through an added pick-up collection is performed, and the data for the added workload is included in the altered delivery plan data.

In the case where the mail processing plan is determined so that the resources allotted according to the work plan of each postal center are less than a reference processing capability (for example, by more than 10%), the manager is notified of the work plan, and data on a collectable quantity of mail from a forecasted quantity of bulk mail to be generated is included and relayed. Thus, the manager for generating/adjusting/performing a work plan 504 relays a result of a comparison of the work plan forecast data and the registered processing capacities to the work plan adjusting data receiver 406, and sends this data to the collection data application manager 302, when it is received respectively through the gateway 401 of the postal network 700 and the gateway 301 of the pre-application system 300. Then, a request is made through the internet 200 by means of the collection and result processor 104 of the bulk mail processing system 100 for corresponding dates for completion forecasted data generation. The collection and result processor 104 sends the data for the corresponding dates for completion, and reflects a working plan for mail relevant postal centers through a work plan devising process.

The collection data application manager 302 of the pre-application system 300 sends check request data for checking whether collection processing is possible one day prior to the above forecasted collection date in the above pre-application registration data, and whether there are no alterations, to the bulk mail address file 102 through the internet gateway 301, the internet 200, and the collection and result processor 104.

When a person in charge at a bulk mail generating company receives check request data for confirming whether there are any alterations, the person in charge checks the data, and replies with an ok button if there are no alterations. The collection status is checked through this reply, and in the case of a bulk mail pick-up collection, collection date plans of the determined data are registered in the bulk mail pick-up request receiver 307 through the collection and result processor 104, the internet 200, and the gateway 301 of the pre-application system 300; and the data required for the pick-up collection dates and collection confirmation is registered in a corresponding transport vehicle manager through the collection data application manager 302. The registration data is stored in the collection data managing DB 303.

The detecting method of the postage to collect checks for same destinations of boxes, packets, etc. that are in pallets, and checks whether they match by reading barcodes or radio frequency identification (RFID) tags that have sorting data recorded thereon such as weight, etc. In further detail, the detecting method for mail also detects whether data for pre-sorting (distribution center ID by postal code and sort plan ID, total weight, separate weight of each parcel, collection date, etc.) is the same as registered data when collected. If alterations exist, the newly altered data is written over the pre-application data to edit the data contents, which are then stored in the collection data managing DB 303.

In the case of in-person applications at post offices or postal centers, when an application is made at a post-office or postal center, a forecasted pick-up date and forecasted pick-up data is relayed to a collection data manager 602 of a collecting system 600. When a pre-application is made to a collection data DB 603, forecasted bulk mail collection data is registered.

It is determined whether bulk mail that is collected is the same as the pre-application conditions thereof by comparing pre-registered data to the collected bulk mail in terms of measured weight and by reading collection data on barcodes or electronic tags. If the collected mail matches the pre-application data, the mail collector 604 completes the collection process. When the detected results indicate a need for adjustment, text data printed on the quantity data to be adjusted, or barcodes or electronic tags on pallets, boxes, or parcels are read to adjust the pick-up collection result data and complete the collection process.

Also, when separate mail is applied for, a collection completion data processor 605 such as a postage machine calculates the quantity of mail and reads delivery addresses of the separate mail, and the collecting system 600 registers quantity data to be transferred to each distribution center in the collection data DB 603, based on the time and date of collection.

When the quantity data is transferred to postal centers (relevant processing sites for the mail) or to collection and delivery centers, in order to discern processing preparation data, data on barcodes or electronic tags (collection site ID, client ID, collection completion data, final transfer distribution center ID, type of mail, sort plan number, etc.) is gathered, and colors and text are written and attached to delivery containers, for operators to be able to discern the data.

Data showing that mail has been loaded on a transport vehicle and has been processed by a processing site according to the above quantity data, is registered in the collection data DB through a perform result manager 607 by means of a transfer check and data processor for transportation to corresponding distribution centers.

A collection data DB 603 that has completed registration as in the above is transferred to the collecting/sorting/arrival/sending result processor 402 through the gateway 601, postal network 700, and the gateway 401 of the real-time mail handling and adjusting system 400, in order for the collected mail to arrive and perform processing at processing centers and relay quantity data by process. The result of the above is a completion of collection, whereby the quantity data is transferred to each manager for generating/adjusting/performing work plan 504.

The mail collected as above is transferred to postal centers and collection and delivery centers, and undergoes arrival/sending work transferring through an arrive/send, check work transfer, and data processor 505, so that arrived transport vehicle numbers, mail that is transferred to processing centers in pallet or box units is automatically read.

When this procedure is implemented, the read data is registered in the operation data managing DB 503 through an operation results managing system processing results transferer 507.

The operation results managing system processing results transferer 507 notifies operators of a work plan by type of mail in terms of quantities to be processed within certain timeframes through messaging the operators' communication terminals.

Each distribution center performs a sorting process while considering a projected work completion time. In order to complete the processing of the mail within an allotted timeframe, data written on the pallets and boxes is obtained. This obtained written data is sent through automatically being sorted by a delivery sorter through automatically read data written on barcodes or electronic tags using the arrive/send, check work transfer, and data processor 505 and the sort processor 506. In the case of sorting only by postal center, after a barcode or electronic tag is read, the data is automatically relayed to a relevant sorter (sorting equipment), whereby the mail inside the box is supplied to the sorter, which performs automatic sorting. Mail that is sorted by sorting equipment is loaded into boxes and relayed to the destinations by including projected delivery completion data on barcodes or electronic tags.

Mail that has been sorted in the above process is loaded onto transport vehicles to be transported to the next distribution center, during which the numbers of the transport vehicles is read through the barcodes or electronic tags, and the pallets or boxes are read in the same manner, thus performing an arrival/sending work transfer checking process in step 505.

In the above process, the read data is registered in the operation data managing DB 503 through the operating results managing system processing results transferer 507. The latter 507 processes a work plan by mail type according to processing time, displays quantity data on a work status plate, and stores processed result data according to the work plan.

The operation results managing system processing results transferer 507 sends the processed work results through the gateway 501, the postal network 700, and the gateway 401 to the collecting/sorting/arrival/sending result processor 402 of the real-time mail handling and adjusting system 400.

In the above process, the collecting/sorting/arrival/sending result processor 402 registers the work results of pallet and box identities by type of mail and work completion times by arrival time, sorting result quantity, and sending in the managing data DB 403.

When the work results are registered at the distribution centers, the manager of mail by type 409 examines projected dates for completion of delivery to collection and delivery centers in pallet and box units by type of mail generated by date at the time of collection, and generates data on mail that does not reach a collection and delivery center within a normal delivery timeframe.

Also, causes of delivery delays are included in the data by route. A delivery time, a reference time that each center takes for processing, and actual processing results included in the delivery delay data are compared, and delay data is extracted and operating results are provided to operators when delays arise. Thus, the delay data is used to calculate a total quantity of mail that exceeds its allotted delivery time from collection to completion of delivery at destinations, allowing insight into the delivery effectiveness of the postal system.

In order to generate data on the reasons for delivery delays, delivery reference times, reference times that each center takes for processing, and actual processing providing operating results to operators, the results are used to calculate a total quantity of mail that exceeds its allotted delivery time from collection to completion of delivery at destinations, allowing insight into the delivery effectiveness of the postal system.

The operating obstacle manager 508 in the real-time planning and operation managing system 500 detects the data on delivery delays including transportation delays, adjusting processing capacities of centers, and sorting equipment malfunctions. When a response to the generated results is determined in the case where adjustment is needed for the delay data through the detected operation managing data, sort plan altering data is sent to the work plan adjusting data receiver 406, the postal center/collection and delivery plan adjusting manager 407, the delivery plan manager and alterer 408, and the sorting plan data manager 410 through the gateway 501, the postal network 700, and the gateway 401 of the real-time mail handling and adjusting system 400, and reference data is altered, re-registered, and implemented, based on the sort plan altering data, thereby minimizing the causes of delivery delays.

The altered reference data is updated and registered in the manager for generating/adjusting/performing work plan 504, the collection data DB 603, and the collection data managing DB 303 of the pre-application system 300 for each center. Therefore, the sort plan altering data is provided to the collection and result processor 104 of the bulk mail processing system 100, and implemented during the processing of mail.

Figure 2:
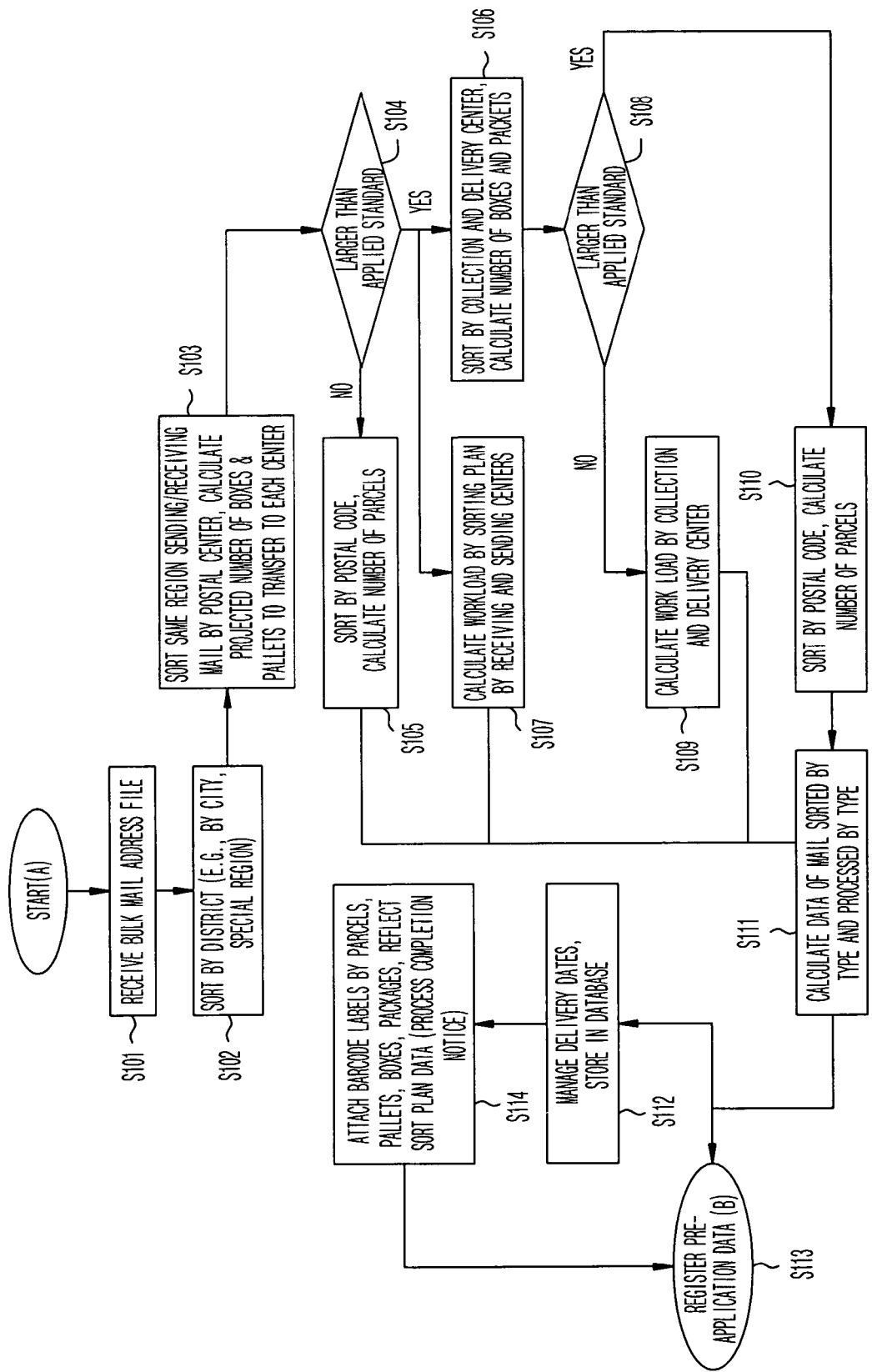
FIG. 2 is an operational flowchart of a preparation stage for processing bulk mail according to the present invention.

FIG. 2 is an operational flowchart of a preparation stage for processing bulk mail according to the present invention.

A description of a method of controlling the flow of postal mail in real-time according to the present invention will now be given, with reference to FIG. 2.

The pre-application system receives bulk mail address files in step S101 when the determining for producing bulk mail is completed.

The bulk mail address files are sorted by district (e.g., province, special zone), based on sort plan data provided by postal service providers in step S102.

Numbers of boxes and pallets projected for transfer to sorting centers by same sending/receiving postal center are calculated in step S103.

It is determined in step S104 whether the numbers of boxes and pallets projected for transfer by postal center calculated in step S103 is a quantity corresponding to standard conditions.

When it is determined in step S104 that the quantity of mail exceeds the standard, the numbers of boxes and pallets for sorting corresponding to the projected quantities to be generated by postal center are calculated in step S106, after which step S108 is performed.

When it is determined in step S104 that the quantity of mail is less than the standard, the total quantity of mail is sorted in 3-digit postal codes, and the quantity of 3-digit postal code mail is calculated. When the quantity of mail sorted in 3-digit postal codes is excessive in terms of a standard number of boxes, the mail is sorted in 6-digit postal codes, and the quantity of 6-digit postal code mail is calculated in step S105.

Upon collection according to the above results, mail that is sorted in postal codes corresponding to sort plan numbers of a sorter is loaded in boxes or pallets, and the sorter numbers are attached to the boxes in the form of barcode and text data.

It is determined in step S108 whether the number results of the sorting boxes and pallets by postal center calculated in step S106 exceeds a standard criteria.

When it is determined in step S108 that the quantity of pallets, boxes, and packets to be sorted by postal center is less than the standard criteria, the quantity of mail is sorted in 3-digit and 6-digit postal codes in step S109.

When it is determined in step S108 that the quantity of pallets, boxes, and packets to be sorted by postal center is more than the standard criteria, the quantity is calculated in terms of a 3-digit postal code. When a quantity of pre-application mail is excessive in terms of a standard number of boxes in a 3-digit postal code, the mail is sorted in 6-digit postal codes and calculated in step S110. Then, mail generating quantity data by mail type and pre-sorting is calculated in step S111.

A quantity is generated accordingly Here, a quantity of packets is calculated only when a quantity of boxes has not been loaded.

When the sorting of mail has been completed up through step S111, the data calculated in steps S103, S105, S107, and S109 is compiled, and the method of sorting the mail by postal code from the sending and receiving mail to be sorted by pallet, box, packet, etc. at each distribution center is performed through sorter numbers according to sort plans of sorters written as barcodes (or RFID tags) and text. Corresponding quantity data is generated, and stored in step S112 in the delivery date database 103.

The above mail processing method is reflected in the sorting of mail, and the resulting numbers of pallets, boxes, packets, and letters (automatically sorted and assigned IDs) have barcodes or electronic tags attached thereto in step S114. It is registered in step S113 that the preparation for collection is completed.

Also, when a request for a processing completion data and quantity data is received through the application request system, a notice for a pick-up collection approval is issued through nearby postal centers, and preparations are made to complete the collection on the projected date of pick-up.

Figure 3:
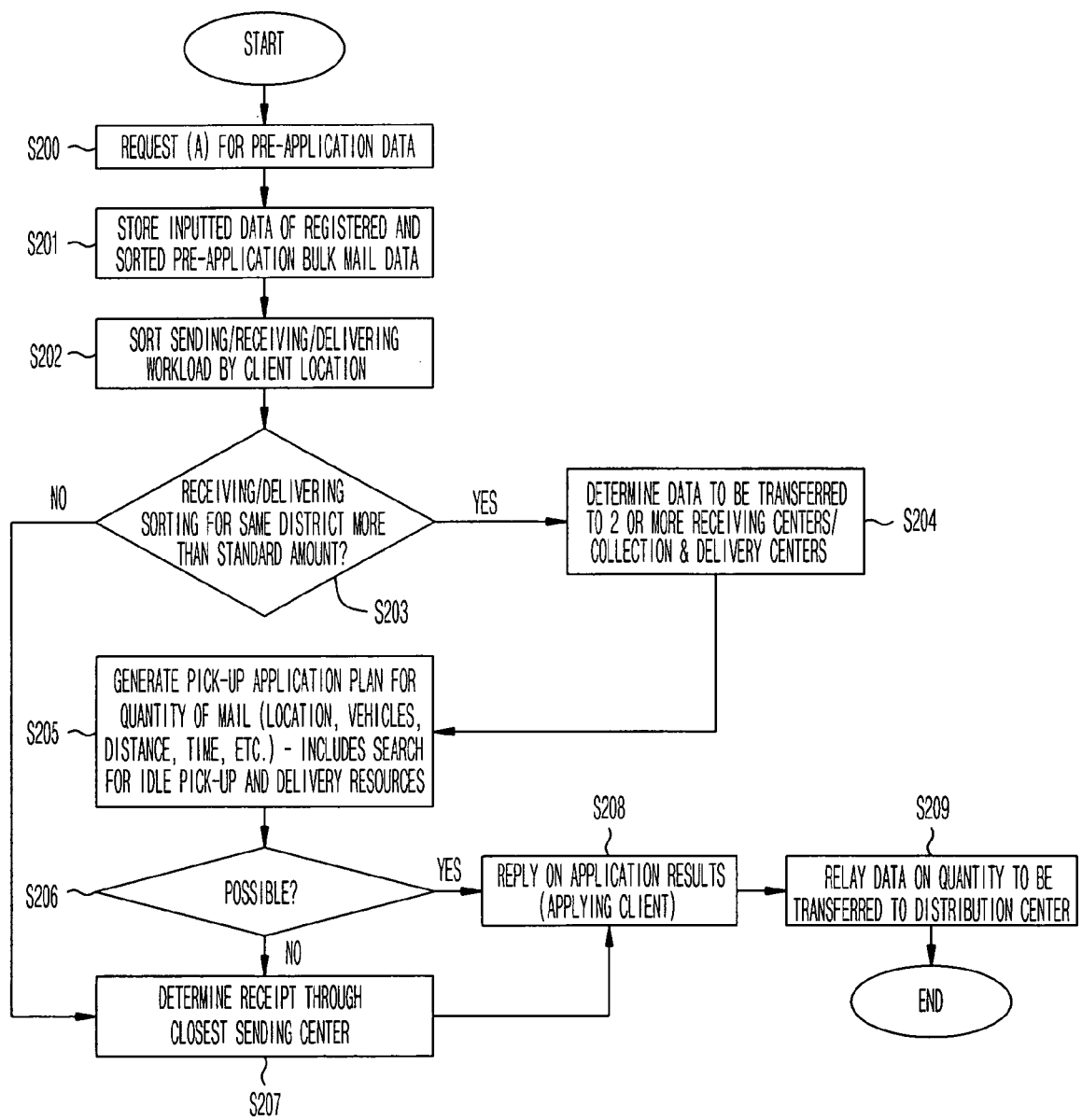
FIG. 3 is an operational flowchart of a pre-collection processing system that determines a mail collecting method and generates data for planning mail processing.

FIG. 3 is an operational flowchart of a pre-collection processing system that determines a mail collecting method and generates data for planning mail processing.

A description of the above-structured method of controlling the flow of postal mail in real-time according to the present invention will now be given, with reference to FIG. 3.

When the pre-application data registration request described in FIG. 2 is received in step S200, the data that is sorted and inputted as pre-application quantity data is stored in the collection data managing DB 303 in step S201, and the pre-application data is sorted in step S202 in terms of sending/receiving/delivery based on the location of the clients.

It is determined in step S203 after searching the quantity data whether the it exceeds a standard criteria for same district receiving/sending sorting.

If it is determined in step S203 that the quantity data is below the standard criteria for same district receiving/sending sorting, it is determined in step S207 to have the client apply in person at the nearest sending center.

If it is determined in step S203 that the quantity data exceeds the standard criteria for the same district receiving/sending sorting, the quantity data is determined to be transferred to two or more receiving centers/collection and delivery centers in step S204, after which step S205 is performed.

Transport vehicles are searched on the bases of client location, operating vehicles, distances, relay stations, delivery times, etc., in order to generate a pick-up collection plan for the mail to be collected, and transport vehicle allotment data (by projected pick-up data and time) is generated in step S205, after which step S206 is performed.

It is determined in step S206 whether allotment of pick-up collection is possible.

When it is determined in step S206 that allotment of pick-up collection is not possible, it is determined in step S207 to have the client apply in person at the nearest sending center.

When it is determined in step S206 that allotment of pick-up collection is possible, the bulk mail client (applicant) is notified of the registration results in step S208, and the data of quantity by type of mail is relayed to a relevant distribution center in step S209.

Figure 4:
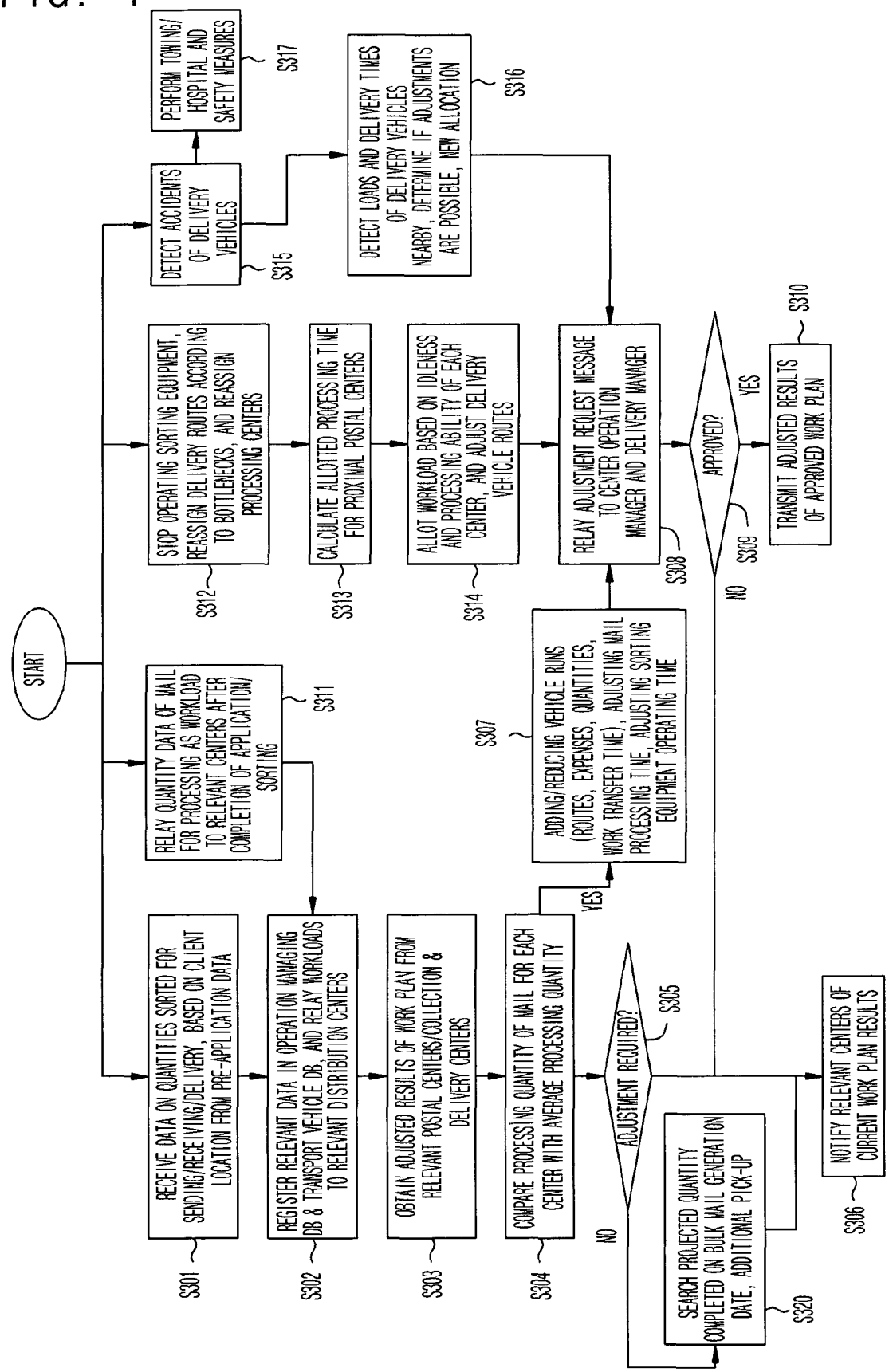
FIG. 4 is an operational flowchart of a process for adjusting a working plan through working plan data and operating data obtained from each of the distribution centers, for controlling the flow of mail in real-time according to an embodiment of the present invention.

FIG. 4 is an operational flowchart of a process for adjusting a working plan through working plan data and operating data obtained from each of the distribution centers, for controlling the flow of mail in real-time according to an embodiment of the present invention.

An above-structured method of controlling the flow of postal mail in real-time will be described with reference to FIG. 4.

When quantity data sorted by client location sending/receiving/delivery from the application data is received in step S301, corresponding data is registered in the managing data DB 403 of the real-time mail handling and adjusting system 400 and the delivery processing DB 404, processing quantities are relayed in step S302 to relevant postal centers, and a work plan adjustment result is obtained from relevant postal centers/collection and delivery centers in step S303.

According to the above results, the processing quantity of mail for each center and reference data of the centers including delivery routes by time, vehicles, characteristics, costs, etc. are compared, and excess quantities of mail by center and the need for additional vehicles (temporary routes) are calculated in step S304.

According to the calculated results in step S304, it is determined in step S305 whether an adjustment for additional (temporary) or less vehicles between centers is needed, based on excess processing quantities at each center or quantities below standard quantities.

When it is determined in step S305 that an adjustment for additional (temporary) or less vehicles between centers is required, work plan adjustment data is generated in step S307 by calculating added/reduced vehicles (in terms of routes, cost, quantity, work transfer time), adjustments in mail processing time, and sorting equipment operation.

When the work plan adjustment data is generated, an adjustment request message is relayed to operators and deliverers in step S308.

It is determined in step S309 whether the message has been approved by all operators and managers.

When it is determined in step S309 that approval has been given by all operators and managers, a work plan adjustment plan is registered as operational managing data and is relayed to work plan generating/adjusting operation managers at relevant centers in step S310.

When it is determined in step S305 that an adjustment to the work plan is not needed, or the approval is not granted, a notice that the current work plan results are to be retained until new work plan adjustment data is generated is issued to the work plan generating/adjusting operation managers at relevant centers in step S306.

When quantity data for which collection has been completed is received, quantity data with adjustments is relayed in step S311. After completion of the relaying, steps S302 through S310 are performed.

When a request for stopping the operation of sorting equipment in a distribution center, a request for re-allotting delivery routes due to bottlenecks, a request for re-allotting processing centers, or a similar request arises in step S312, workloads are measured according to work plans of nearby postal centers during the repairing time of the sorting equipment of a center, to compare free amounts of mail processing times in step S313.

An allotment of a workload data (including sort plan data of sorters to be temporarily used) according to idleness of postal centers and transport vehicle route adjustment data is generated in step S314, and step S308 is performed. The allotment of workload data and the transport vehicle route adjustment data are decided in an adjustment and approval process in steps S308 through S310.

Also, if a transport vehicle should break down or be involved in an accident during operation in step S315, towing, transport of personnel to hospitals, and safety measures are performed in step S317, the loads and arrival time plans of nearby transport vehicles are considered in step S316, while step S308 is simultaneously performed, to ensure speedy processing of accidents and delivery of mail in an adjusted work plan.

Additionally, if a message is determined to be received in step S305 that there is an excess or insufficiency of a workload at a distribution center, a processing completion forecast data request from the bulk mail processing system 100 and obtained data are relayed and reflected in work plans of relevant distribution centers in step S320, and pre-collection quantity alteration data is sent to relevant distribution centers.

Figure 5:
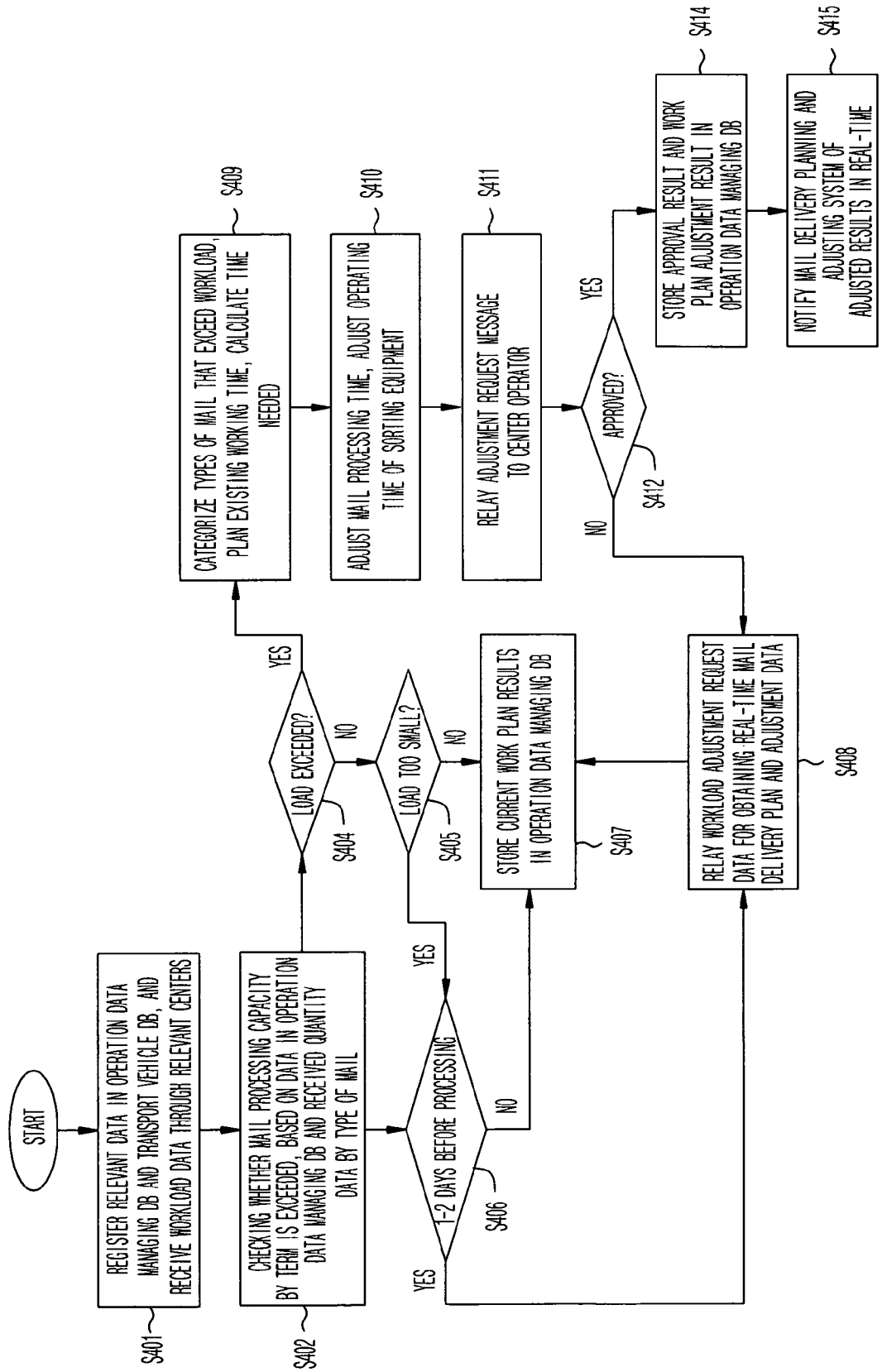
FIG. 5 is an operational flowchart of a process of adjusting the working plan of a distribution center according to an overall system for controlling the flow of mail in real-time according to an embodiment of the present invention.

FIG. 5 is an operational flowchart of a process of adjusting the working plan of a distribution center according to an overall system for controlling the flow of mail in real-time according to an embodiment of the present invention.

A method of controlling the flow of postal mail in real-time according to the present invention, as configured above, will now be described with reference to FIG. 5.

Relevant data is registered in the managing data DB 403 and the delivery processing DB 404 in step S401, and workload data is received from relevant postal centers. It is determined in step S402 whether the data of the managing data DB 403 exceeds the mail processing capacity by received mail type, time, and quantity.

It is determined in step S404 whether the mail processing capacity or the load has been exceeded from the comparison result of step S404.

When it is determined in step S404 that the mail processing capacity has been exceeded, the mail processing type, an existing processing time plan, and required calculations are calculated, extendable times are calculated according to adjustable mail processing times within the centers and workloads of sorting equipment operation, and adjustments are made in steps S409 and S410.

The above results are relayed to operators in the distribution centers in the form of adjustment request messages in step S411, and it is determined in step S412 whether the operators approve the request. The approval result is stored in step S414 in the operation data managing DB 503, and is reflected in the work plan when the approval result is a positive result. Here, an adjusted result according to the approval is sent to the real-time mail planning and adjusting system in step S415.

If it is determined in step S412 that the approval has not been made or that there are workloads of the centers that cannot be adjusted according to the workload data, the workload adjustment request data is relayed to the real-time mail planning and adjusting system as work plan adjustment data in step S408, the current work plan results are stored in the operation data managing DB 503 in step S407, and the work plan adjusted in the process is received and reflected in performing mail processing.

If it is determined in step S404 that the workload has not been exceeded, it is determined in step S405 whether the workload is excessively small. If it is determined in step S405 that the workload is not excessively small but adequate, step S407 is performed.

If it is determined in step S405 that the workload is excessively small, it is determined in step S406 whether it is 1 to 2 days before the start of mail processing.

If it is determined in step S406 that it is 1 to 2 days before the start of mail processing, step S408 is performed, and if it is determined in step S406 that there are more than 2 days before the start of mail processing, step S407 is performed, where an added allotment of workload received through the work plan system of the mail planning and adjusting system is implemented.

Figure 6:
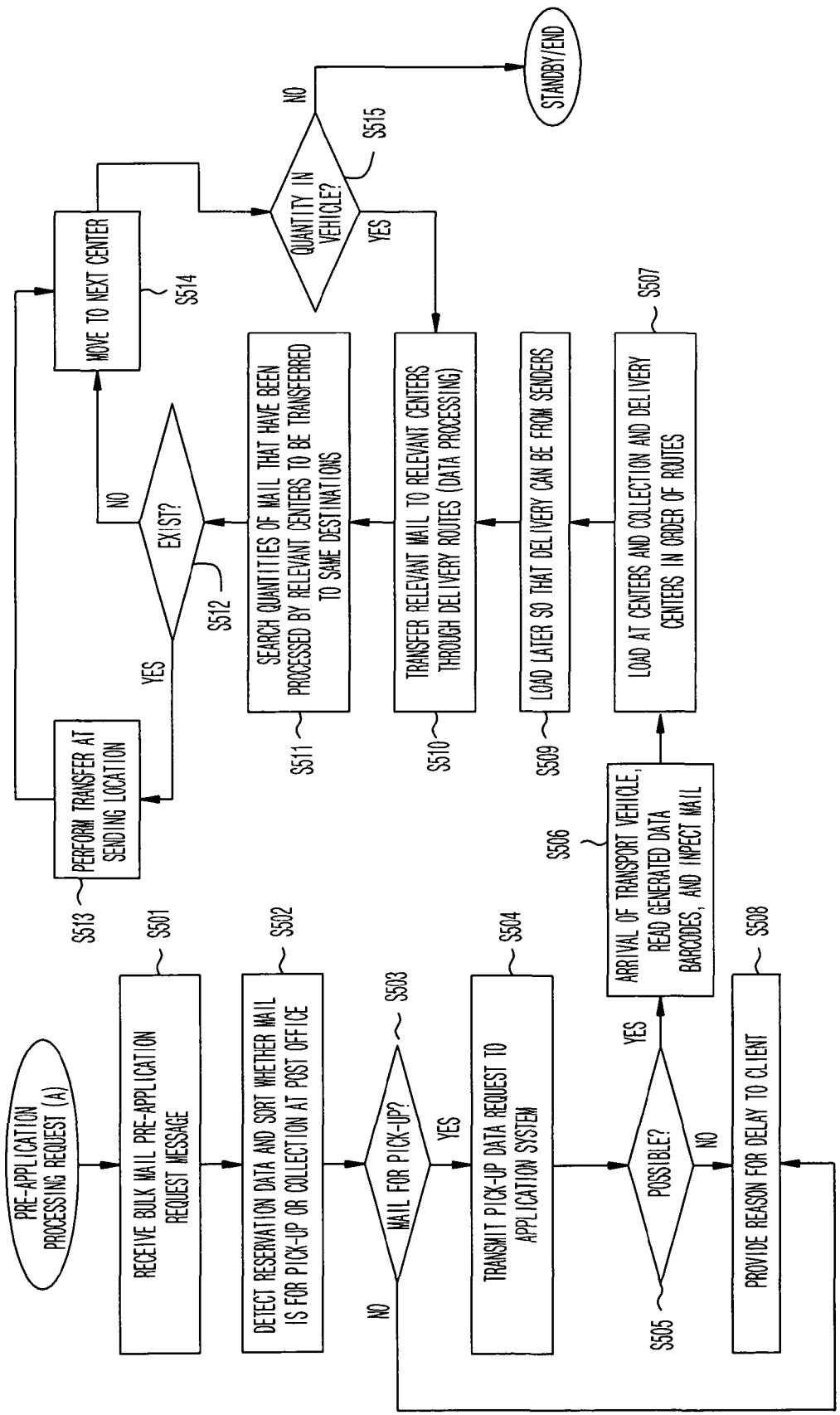
FIG. 6 is an operational flowchart of a method for collecting bulk mail and delivering the mail to distribution centers according to an embodiment of the present invention.

FIG. 6 is an operational flowchart of a method for collecting bulk mail and delivering the mail to distribution centers according to an embodiment of the present invention.

A method configured as above of controlling the flow of postal mail in real-time according to an embodiment of the present invention will now be described with reference to FIG. 6.

When it is detected in step S501 that a bulk mail pre-application request message such as that described in FIG. 1 is received or when 1 day remains before the collecting point of the mail, it is sorted and determined in step S502 whether the mail is for a reservation data search and pick-up collection or an application at a post office.

If it is determined in step S503 that the result sorted in step S502 is for pick-up collection, the pick-up collection data is sent to a relevant pick-up system in step S504.

When a transport vehicle is delayed in arriving in step S505, a reason for the delay and a projected arrival time are provided to the bulk mail client, which is inputted within the transport vehicle by a collecting person in the form of a message in step S508.

When the transport vehicle arrives at the bulk mail client's location, the barcodes or electronic tags of the generated data text are read and the mail is inspected in step S506. Collected mail is loaded on the transport vehicle in the order of the locations of sending postal centers and arrival postal centers/collection and delivery centers according to stops along a route. After the arrival/delivery sorted mail is loaded according to stops along the route in step S507, the sending center mail is loaded in step S508. This is because delivery is performed after sorting is performed at centers with large amounts of sending mail, so that mail is first relayed to postal centers to which sending mail is to be transferred.

After relevant mail is relayed to distribution centers along the delivery route, a receiving/sending transfer confirmation result of the transferred quantity is registered at the distribution centers in step S510.

Data on a freed loading space in the distribution center equal to the amount transferred during the mail transfer process is inputted in relevant operation result managing and processing transfer system in step S511.

A search for mail to be sent to the same destinations is conducted from the mail that has been processed at centers, to determine whether mail to be sent to common destinations exists in step S512.

If it is determined in step S512 that mail to be send to common destinations exists, the transport vehicle is loaded by as much as its remaining capacity in a transferring process at a relevant sending site of a center, and the loaded mail is registered in step S513, after which the vehicle moves to the next center in step S514 to repeat the process.

If it is determined in step S512 that mail to be sent to common destinations does not exist, step S514 is performed.

Figure 7:
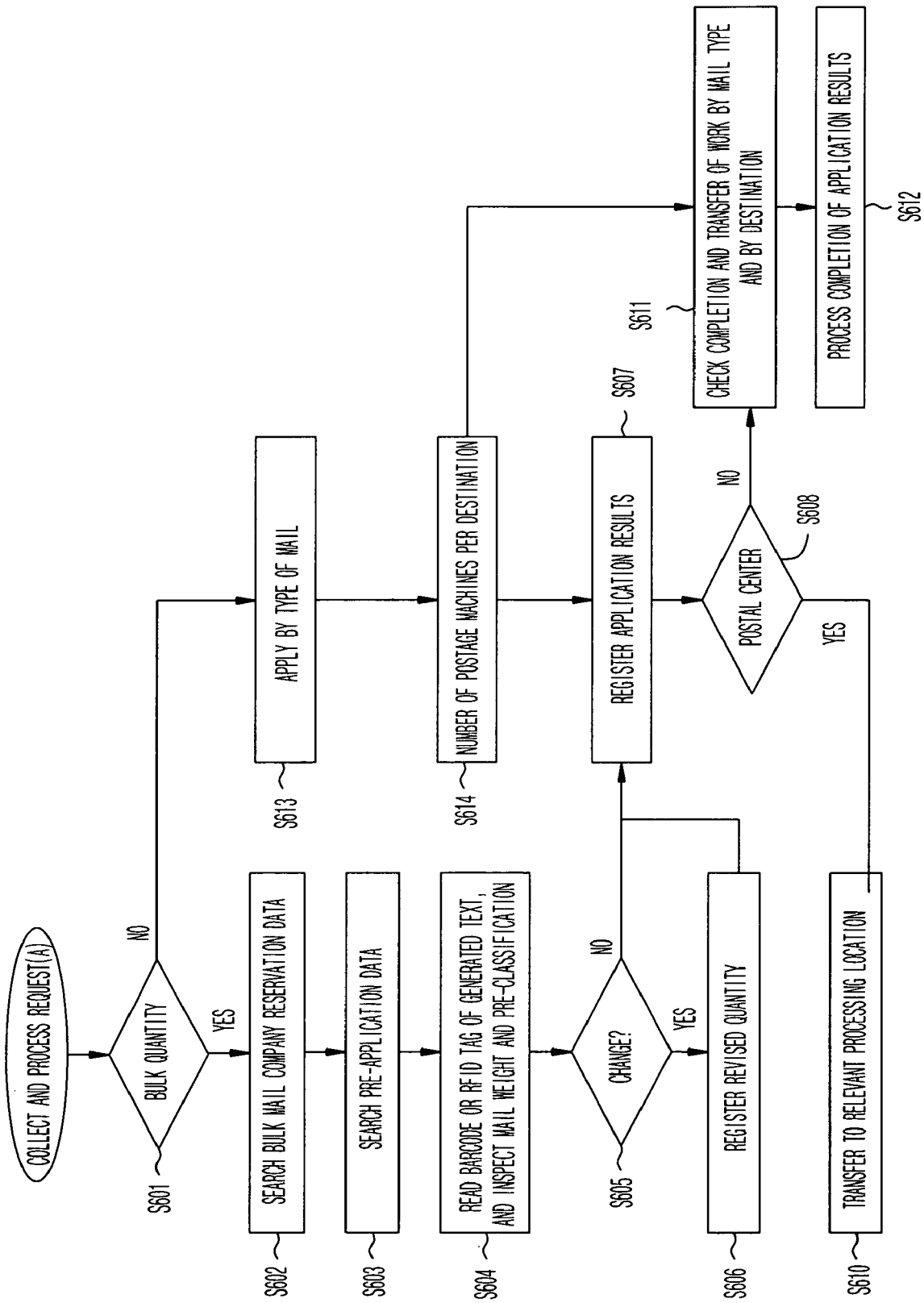
FIG. 7 is an operational flowchart of a process of controlling the flow of mail in real-time according to an embodiment of the present invention.

FIG. 7 is an operational flowchart of a process of controlling the flow of mail in real-time according to an embodiment of the present invention.

A method configured as above of controlling the flow of postal mail in real-time according to an embodiment of the present invention will now be described with reference to FIG. 7.

When a mail collection request is confirmed at a postal center or a post office, mail is collected through separating bulk mail from individual mail, and it is determined whether the mail for collecting is bulk mail, a small quantity or individual mail in step S601.

When it is determined in step S601 that the mail is bulk mail, the reservation data of the bulk mail company is inspected in step S602, and it is detected in step S603 whether reservation conditions exist, that is, if a pick-up collection has been reserved.

It is determined in step S604 whether the above results match the mail collection document and the written data on the mail itself, that is; through reading barcodes with data text or electronic tags, and weighing the mail and determining its pre-sorted status.

It is determined whether the results from step S604 are the same as pre-application results, or if there are alterations in step S605.

If it is determined in step S605 that there are no alterations, that is, if the pre-application data is the same, then the result is processed as a collection result in step S607.

If it is determined in step S605 that there are alterations, added or reduced quantities are checked, and revisions are made in step S607 through read results of inputted text or text provided in barcodes, and the collection results are registered.

It is determined in step S608 whether the location of mail application is a collection and delivery center from distribution centers.

When it is determined in step S608 that the registered results show the distribution center to be a postal center, the mail is transferred to a relevant processing location in step S610. When it is determined that the mail was not applied at a post office or postal center, collection and transfer of mail by type of mail and destination is checked in step S611 when the mail is sent to postal centers, and the checked results are registered in the collection data DB through the perform result manager 607 in step S612.

When the above process is completed, a process is performed for relaying the results to the application result processor of the real-time mail handling and adjusting system 400 and enable relaying application completion quantity data to mail processing centers. Here, the data of the altered quantity and the pre-application registration results are registered, and an application result quantity for using the mail processing plan data is transferred.

If it is determined in step S601 that the mail is not bulk mail and is individual mail, application processing is performed by mail type in step S613. When an application is made by destination and mail type, the quantity of mail is calculated by destination in step S614 through reading an attached barcode and a postmarking of the mail, after which it is registered in step S607 as an application result.

Figure 8:
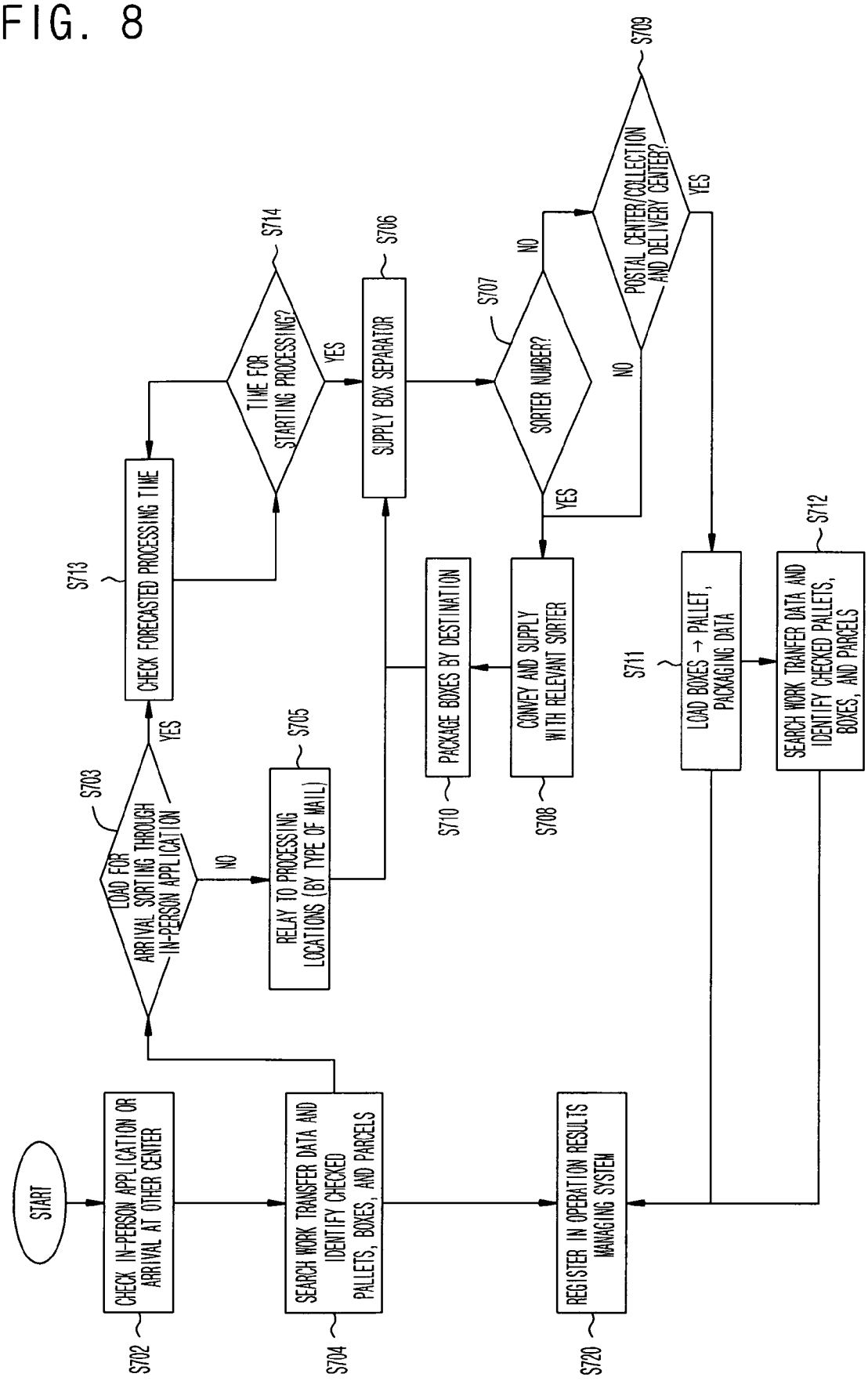
FIG. 8 is an operational flowchart for processing the results from mail transferring and separating according to an embodiment of the present invention.

FIG. 8 is an operational flowchart for processing the results from mail transferring and separating according to an embodiment of the present invention.

A method configured as above of controlling the flow of postal mail in real-time according to an embodiment of the present invention will now be described with reference to FIG. 8.

When mail arrives at a distribution center (postal center/collection and delivery center), delivery data is checked in step S702 through a discerning of pallets, boxes, and parcels in a work transfer data search and check process, where it is determined if the mail is a result of an in-person application or has arrived from another postal center.

The work transfer data checked in step S702 is searched and checked in step S703 to discern the pallets, boxes, and letters in step S704.

It is determined in step S703 whether the checked results of the discerned work transfer data shows that the mail is a quantity for arrival sorting/in-person application. The discerning results in step S704 are registered in step S720 in the operation data managing DB 503.

If it is determined in step S703 that the mail is not for arrival sorting/pick-up collecting, that is, if the mail is a quantity that is reserved for pick-up, the mail is relayed to relevant processing locations (by mail type) in step S705 to first perform processing of arrived mail at other postal centers.

When boxes in pallets are supplied to box sorters in step S706, it is determined in step S707 whether sorter numbers exist by reading the barcodes or electronic tags on the boxes.

If it is determined in step S707 that there are no sorter numbers, mail that has been sorted by sorters are loaded in boxes in step S710 in order to transfer boxes to be transferred to other collection and delivery; centers to other postal centers or collection and delivery centers, using barcodes or electronic tags including destination data.

If it is determined in step S707 that sorter numbers exist, the boxes are moved to relevant sorters in step S708. Here, there are no sorter numbers so that the boxes must not be sent to the collection and delivery centers. When sorters must be used to perform sorting, the sorters are moved manually in step S710.

Mail that has been sorted by a sorter is filled in boxes in step S710, and barcodes or electronic tags including destination data are used. Following step S710, the boxes are supplied to the sorters and sorted by destination in step S706, in order to transport them to a sending center.

If it is determined in step S703 that the mail is to be sorted upon arrival due to in-person application, the mail is processed in order of priority based on processing time left until delivery completion, and is transported to a temporary storage after the projected processing time is checked in step S713.

The quantity of mail sent to the temporary storage in step S713 is supplied to the box sorter in step S706 when the processing time arrives in step S714. Before that, the mail is stored in the temporary storage.

If it is determined in step S707 that sorter numbers do not exist, it is determined in step S709 whether the mail is to be sent to postal centers/collection and delivery centers.

When it is determined in step S709 that the mail is to be sent to postal centers/collection and delivery centers, the boxes are filled in corresponding pallets in step S711, and step S720 is performed in which the filled data is registered in the operation result manager system 507.

Additionally, when the operation results of the thus stored distribution centers (transfer and sorting results of pallets, boxes, etc.) are registered, separate points of collection to the projected dates of delivery completion at distribution and collection centers in terms of pallets and boxes by generated type of mail are compared by the mail by type delivery quality managing system, and workload data by route that does not reach the collection and delivery center within the allotted time is calculated. In order to generate data on the reasons that cause delivery delays, the standard delivery times, the standard times of each center's processing, and the actual processing results are compared, and data on the reasons for delays are extracted and provided to operators. Thus, the result allow the calculation of a total quantity of mail that exceeds a target time to be delivered from collection to delivery, in order to understand the operational effectiveness of the postal system.

The above results allow causes of delays to be perceived and adjustments to be made to the processing capacities of centers, by re-registering and implementing standard data, to minimize causes of delivery delays.

A large quantity of generated mail in bulk mailing that are not presorted and sent to other districts are collected by postal centers collection and deliver centers within a certain sized area (for example, Gyeonggido, Seoul, and Incheon). Through this method of transferring the mail, the number of stopover centers used for delivery can be minimized through the use of a real-time controlling method for mail flow, which enables bulk mail collected from bulk mail producing companies at a post office or postal center in one location to be sorted according to sending and delivering, and relayed to collection and delivery centers. By presorting the flow of mail, the sorted condition can be kept in mind when relaying the mail collected at relevant postal centers and collection and delivery centers. The load for sending and receiving sorting for same districts can be minimized accordingly.

That is, clients that generate bulk mail can obtain delivery route and quantity data (by type of mail, presorted state, whether barcodes are printed) in advance using a real-time managing system. After collection, the actual logistics data is shown, so that the work plans of postal centers and collection and delivery centers can be optimized, and postal centers and workloads of collection and delivery centers can be equalized to devise and implement a mail processing plan in real time and manage delivery quality with the resulting data.

As described above, the method and system of controlling the flow of postal mail in real time according to the present invention minimizes sorting processing of mail from collection to delivery, by relaying the mail to postal centers and collection and delivery centers. Also, the method and system prevent the occurrence of impediments to mail delivery to raise the quality of postal service.

Additionally, the method and system of controlling the flow of postal mail in real time according to the present invention collect and distribute a generated quantity of mail to postal centers and collection and delivery centers. When the quantity of mail that is to be transferred to postal centers for arrival sorting is large, a cost reduction can be made by having the postal centers that sort sending mail to sort both arriving and sending mail. Thus, transporting time and the time it takes for sorting sending mail can be saved to be added towards the time for delivery. Due to flexibility in adjusting processing times, large improvements can be made in effectiveness.

Furthermore, a method and system of controlling the flow of postal mail in real time according to the present invention increase the processing capacity of postal centers, minimize the causes for delivery delays, so that the usable resources for processing mail can be used more effectively, increasing the reliability of delivery quality.

Also, method and system of controlling the flow of postal mail in real time according to the present invention takes into account the percentage of mail that bulk mail occupies the application regions, and the delivery regions, to allow the control of mail flow in real-time, minimizing sending and arrival sorting work. According to the system of relaying presorted mail, the arrival sorting workload can be reduced to reduce postal costs and improve the flow of mail.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A logistical system of controlling postal mail in real-time, the logistical system comprising:
    a pre-application processing system for registering bulk mail inputted in a generating system for generating bulk mail, and generating sending data and quantity data of the registered bulk mail;
    a real-time mail planning and adjusting system for collecting predetermined working plan quantities to process the quantity data for respective distribution centers, comparing operating reference data of transport vehicles between the distribution centers for setting transport vehicle dates, and allocating temporary vehicles when a quantity for delivery between the distribution centers exceeds processing capacities of the distribution centers; and
    a real-time working planning and performing system for using the quantity data to transfer a quantity of bulk mail for processing by distribution center and by work processes to postal distribution centers, and collecting and comparing working plans from each of the postal distribution centers and processing the working plans.

2. The apparatus of claim 1, further comprising an application system for receiving pre-applications for pick-up collection of quantities of bulk mail, registering the pre-applications as future bulk mail collection data, completing registering by reading the quantities of bulk mail and altering the quantities of bulk mail to pick-up collection result data including quantity data, registering and processing the quantity data to be transferred by each distribution center according to date and time of application in an application data database, and processing the application data as pick-up collection data.

3. The logistical system of claim 1, wherein the pre-application processing system further comprises:
    an application data registration manager for providing sorting and required planning data of postal centers and postal codes by collection and distribution centers, in a process of preparing a sorting of mail to be sorted by type and a transferring of the sorted mail to distribution centers, and generating a pre-application quantity data of a pre-applied quantity of mail;
    a bulk mail pick-up collector for performing a sorting process of postal address files with postal centers, collection and distribution centers, postal codes, and a sorter and a sorting plan, when an address file for generating bulk mail is obtained through the sorting reference data, and for generating a bulk mail generating quantity data and pre-applying the bulk mail;
    a calculator for a transfer plan by sending/receiving/delivering centers for comparing reference data and arrival postal centers of same regions as pre-application quantity data registered through the application data registration manager, and transferring quantities for collection and distribution centers, and determining a collection of bulk mail generated results; and
    a mail collection and transfer plan generator and manager for inquiring whether excesses or deficiencies of work loads arise at distribution centers, and whether a bulk mail generation completion forecast exists.

4. The logistical system of claim 1, wherein the real-time working planning and performing system comprises:
    an operation result manager using the pre-application quantity data to relay a work load by center and by work process to mail distribution centers, and providing a quantity data for devising a working plan for the distribution centers; and
    a manager for generating/adjusting/performing a working plan, comparing work load data and a reference work processing quantity for each distribution center by type of mail and work process, and designating the workload data as a working plan if the workload data is less than the reference work processing quantity.

5. The logistical system of claim 2, wherein the application system for processing quantities of bulk mail for pick-up collection records data on a barcode or an electronic tag, such that work preparation data when the quantity data is transferred to a postal center or a collection and delivery center, attaching identifying color and text on transport containers for an operator to recognize, conveying data showing that a quantity of mail has been loaded on a transport vehicle and processed by a processing location according to the quantity data, and registering conveyed results in an application data database within the application system.

6. The logistical system of claim 5, wherein data recorded on the barcode or the electronic tag comprises customer IDs, application completion dates, final logistics check IDs, types of mail, and sort plan numbers.

7. A computer implemented method for real-time controlling of postal mail flow, comprising the steps of:
    pre-application registering for registering a quantity of mail data and projected sending date data according to mail type and presorted condition, for pre-application quantity data registered prior to bulk mail generation;
    performing, by a processor, a first calculating step for calculating a workload of the quantity of mail data registered in the step of pre-application registering by post office, postal center, and collection and delivery center that perform mail processing, and calculating a transferable quantity after the transferable quantity is received from postal centers that perform sending/receiving/delivering sorting processes;
    performing a first determining step for examining and determining a working plan by relaying a mail quantity to postal centers and collection and delivery centers, generating working plan data reflecting the quantity data transferred to relevant distribution centers, and analyzing workloads of distribution centers;
    adjusting a working plan devised by the distribution centers in the step of first determining by receiving quantity data by mail type for which application has been completed and data that has been completely processed at the distribution centers and is delivered;
    performing a first comparing step for generating quantity data comparing mail processing work capacities of neighboring post offices, postal centers, collection and delivery centers for the adjusted working plan in the step of adjusting the working plan;

performing a second determining step for determining a postal working plan for minimizing unnecessary mail processing by considering a pre-applied quantity from the pre-application quantity data in the step of pre-application registration, the mail processing work capacity of the relevant distribution centers, and quantity data compared in step of the comparing, and setting a maximum number of routes with shortest distances between the distribution centers and nearest post offices, postal centers, collection and delivery centers, and delivery centers;

performing a first notifying step for notifying a decision maker of a mail processing result by examining hindrances of postal processing quality, using a bulk mail generating schedule and forecasted generating completion data, and working plan data of postal centers, considering delivery quality, working costs, and delivery costs up to a delivery completion point, and generating mail processing result data for adjusting a flow of postal mail in real-time;

revising a working plan including sorting plan data of a sorter, and generating revised data, by receiving the pre-application data generated in the first notifying step and mail processing result data as a basis for determining a plan according to an approval of the decision maker, and relaying a determined data for operation to each distribution center; and performing a third determining step for determining the working plan by revising a workload data included in the distribution centers receiving the revised workload data.

8. The computer implemented method of claim 7, wherein the step of pre-application registering comprises:

receiving bulk mail address files after a determining of the bulk mail generating is completed;

performing a first sorting step for sorting the bulk mail address files by district according to a sorting plan already provided by a mail service provider;

performing a second calculating step for calculating a projected transferring quantity in terms of numbers of boxes and pallets by sending/receiving centers and sorting centers for same districts;

performing a first determining step for determining whether the projected transferring quantity in terms of numbers of boxes and pallets by sorting centers in the second calculating step is a quantity corresponding to pick-up collection reference conditions;

performing a third calculating step for calculating numbers of sorting boxes and packets of a projected quantity for each corresponding collection and delivery center, when it is determined in the first determining step that the transferring quantity exceeds the pick-up collection reference conditions;

performing a fourth calculating step for sorting a total quantity of mail into a 3-digit postal code when the total quantity is less than an applicable standard, and sorting the total quantity of mail into a 6-digit postal code when the total quantity is more than a number of box units for the 3-digit postal code;

representing sorter numbers and text on barcodes attached to boxes, through loading the boxes or pallets upon collection with respect to a result of the fourth calculating step, and loading mail generated with postal codes corresponding to sorter sorting plan numbers;

performing a second determining step for determining whether results of calculated numbers of sorted boxes and pallets by collection and distribution centers in the third calculating step exceeds the applicable standard;

sorting an applicable quantity of mail into 3-digit postal codes and 6-digit postal codes, when it is determined in the second determining step that the total quantity is less than the applicable standard in terms of numbers of pallets, boxes, and packets per collection and delivery center;

performing a fifth calculating step for calculating a quantity according to a postal code sorting in the step of sorting the applicable quantity, when it is determined in the second determining step that the total quantity is less than the applicable standard in terms of numbers of pallets, boxes, and packets per collection and delivery center;

performing a sixth calculating step for calculating mail generating quantity data in pre-sorted form by type of mail;

performing a storing step by collecting data calculated in the third through sixth calculating steps, representing the sorter numbers in barcodes or text on electronic tags according to a sort plan of a sorter from results for delivery container units by distribution centers, generating quantity data of represented results, and storing the generated quantity data in a generating and managing date database;

attaching barcodes or electronic tags on pallets, boxes, and mail, according to results of a sorting and generating procedure reflecting a designated mail generating system from the storing step; and registering pre-collection data following a notice of pre-collection completion.

9. The computer implemented method of claim 7, wherein the first determining step comprises:

re-sorting quantity data from pre-application data into sending/receiving/delivering according to client location, following a storing of data sorted in the pre-application registering data in a pre-application data managing database, when a pre-application data registering request is generated in the step of pre-application registering;

performing a third determining step for inspecting the quantity data and determining whether a same district arrival/delivery sorting processing quantity exceeds a standard quantity;

performing a fourth determining step for determining an in-person application by a client at a nearest sending center, when it is determined in the third determining step that the processing quantity is less than the standard quantity;

performing a fifth determining step for determining a transfer of the processing quantity to two or more arrival centers/collection and delivery centers, when it is determined in the third determining step that the processing quantity exceeds the standard quantity;

generating allotment data by searching transport vehicle data for generating a pick-up collection plan for mail to pick up, and generating pick-up collection vehicle allotment data;

performing a fourth determining step for determining whether pick-up collection allotment is possible, using the allotment data generated in the generating step;

performing a sixth determining step for determining an in-person application by a client at a nearest sending center, when it is determined in the fourth determining step that the pick-up collection allotment is not possible; and performing a first transferring step for notifying the client of the registered results, and transferring the quantity data by type of mail to a relevant distribution center, when it is determined in the fourth determining step that the pick-up collection allotment is possible.

10. The computer implemented method of claim 7, wherein the adjusting step, the first comparing step, and the second determining step comprise:

obtaining working plan adjustment results from corresponding postal centers/collection and delivery centers by registering corresponding data in a operation managing data database and a transport vehicle database, and transferring workloads to respective postal centers;

performing a seventh calculating step for comparing mail processing quantities of each postal center to a standard operational data of the postal centers collectively, and calculating excess workloads of the postal centers and additional vehicle requirement data between the postal centers;

performing a fifth determining step for determining whether an adjustment of adding/reducing transport vehicles between postal centers is required due to the workloads for each postal center being excessive/insufficient, as calculated in the seventh calculating step;

performing an eighth calculating step for calculating an addition/reduction of transport vehicles, an adjusting of mail processing time, and an operating time of sorting equipment, and generating working plan adjustment data;

performing a second transferring step for transferring an adjustment request message to postal center operators and delivery managers, when the working plan adjustment data is generated;

performing a sixth determining step for determining whether the adjustment request message is approved by all operators and managers;

performing a third transferring step for registering the working plan adjustment request to the operation managing data database, and transferring the working plan adjustment request to working plan generating/adjusting/performing/managing units of relevant distribution centers, when the adjustment request message is approved by all the operators and managers in the sixth determining step;

performing a second notifying step for notifying the working plan generating/adjusting/performing/managing units of relevant distribution centers of current working plan results, when an adjustment of the working plan is not required or until new working plan adjustment data is generated due to a lack of approval;

performing a fourth transferring step for transferring quantity data created according to changed conditions, when quantity data for which an application has been completed is received;

performing a second comparing step for comparing workloads to mail processing allotted times by workloads according to working plans of nearby postal centers, during a repairing time of sorter equipment at relevant postal centers, when a reallocation of delivery routes is made, according to an end of an operation of sorting equipment and arising of bottlenecks at distribution centers and according to a need for reallocating processing centers;

processing mail when a mail transport vehicle breaks down or is involved in an accident during operation, performing towing/hospital and safety requirements, searching for nearby transport vehicles, searching loads and transporting times of the nearby transport vehicles, and quickly delivering the mail; and performing a third notifying step for transferring requested and obtained forecast data generated by a bulk mail generating system to reflect the working plans of the relevant distribution centers, and notifying the relevant distribution centers of pre-collection quantity change data.

11. The computer implemented method of claim 7, wherein the first notifying step, the revising step, and the third determining step comprise:

performing a third comparing step for registering relevant data in an operation managing data database and a transport vehicle database, receiving workload data at relevant postal centers, and comparing the workload data to a mail processing capacity by time in terms of data in a working data managing database and types of mail received;

performing a seventh determining step for determining whether the mail processing capacity by time is exceeded;

performing an adjusting step by calculating an end of mail processing, a plan of a current processing time, and a required time when it is determined in the seventh determining step that the mail processing capacity is exceeded, calculating an extendable time according to mail processing times that are adjustable by postal centers and workloads of sorting equipment operating times, and adjusting mail processing times accordingly;

performing an eighth determining for relaying an adjustment request message to operations managers of the distribution centers according to results of the step of adjusting the mail processing times, and determining whether the operations managers approve the adjustment request message;

performing a fourth notifying step for storing an approved result in the working data managing database, when it is determined in the eighth determining step that the approval has been made, reflecting the approval result as a working plan including sorting plan data of a sorter, and notifying a real-time mail planning and adjusting system of the approval result; and performing mail processing by storing the processed working plan results in the working data managing database, and reflecting adjusted working plan results.

12. The computer implemented method of claim 11, further comprising:

performing a ninth determining step for determining whether there are one to two days from the start of mail processing, when it is determined in the seventh determining step that the mail processing capacity is not exceeded; and performing an executing step for performing the fifth transferring step when it is determined in the eighth determining step that there are one to two days from the start of the mail processing, and performing the mail processing when it is determined in the eighth determining step that there are not one to two days from the start of the mail processing.

* * * * *